United States Patent [19]

Splawinski

[11] Patent Number: 4,766,693
[45] Date of Patent: Aug. 30, 1988

[54] HUMANE ANIMAL AND FOWL TRAP

[76] Inventor: Thaddeus M. Splawinski, Box 7066, Saskatoon, Saskatchewan, Canada, S7K 4J1

[21] Appl. No.: 62,432

[22] Filed: Jun. 15, 1987

Related U.S. Application Data

[63] Continuation-in-part of Ser. No. 820,007, Jan. 21, 1986, abandoned, which is a continuation-in-part of Ser. No. 695,559, Jan. 28, 1985, abandoned.

[51] Int. Cl.⁴ ........................................... A01M 23/26
[52] U.S. Cl. ........................................... 43/88; 43/92; 43/90
[58] Field of Search ............... 43/88, 90, 92, 93, 95, 43/81, 70, 72

[56] References Cited

U.S. PATENT DOCUMENTS

| | | | |
|---|---|---|---|
| 499,079 | 6/1893 | Alexander | 43/92 |
| 1,000,007 | 8/1911 | Jackson | 43/92 |
| 1,494,918 | 5/1924 | Kleinpeter | 43/92 |
| 2,241,529 | 5/1941 | Taylor | 43/88 |
| 3,939,596 | 2/1976 | Webley | 43/93 |
| 4,045,905 | 9/1977 | Souza | 43/88 |
| 4,366,642 | 1/1983 | Gardner et al. | 43/88 |

Primary Examiner—Kurt Rowan
Attorney, Agent, or Firm—Stanley G. Ade; Adrian D. Battison; Murray E. Thrift

[57] ABSTRACT

Conventional traps often catch animals by the leg rather than killing them outright. This trap utilizes two spring actuated jaws closing upon a base ring but with stops on the base ring maintaining the movable jaws slightly open when sprung so that an animal cannot be caught by the leg. The trip mechanism is such that it can be actuated by pressure upon any part of the pan thus releasing the jaws and killing the animal with a blow to the head or neck area. The spring mechanism is such that if large animals are accidentally caught by the foot, they are able to pull foot free.

14 Claims, 7 Drawing Sheets

HUMANE ANIMAL AND FOWL TRAP

This application constitutes a continuation in part of Ser. No. 820,007, filed Jan. 21, 1986, now abandoned, which in turn is a continuation-in-part application of application Ser. No. 695,559, filed Jan. 28, 1985, now abandoned.

BACKGROUND OF THE INVENTION

This invention relates to new and useful improvements in animal traps, particularly animal traps which utilize spring loaded jaws which can, when tripped, snap together with considerable force and thus instantly render the animal unconscious or dead unlike the conventional leg/body holding trap which holds the animal until death occurs.

SUMMARY OF THE INVENTION

The present invention overcomes disadvantages inherent with such traps by providing a device in which the jaws move from a substantially vertical position, away from one another, towards a base and include means to prevent the jaws from closing fully upon the base, when sprung, thus enabling an animal to withdraw or disengage the leg if the position of the animal is such that it is not killed outright by a blow to the head or neck area.

Alternatively, the underside of the central portions of the jaws may be concavedly curved or cut away so that a space is left between the underside or outer edge of the jaws and the upper sides of the base when the trap is in the sprung position.

A further improvement in the preferred embodiment permits the bait to be adjusted with relation to the jaws in order to accommodate variations in the size of animal to be trapped. Furthermore, the pan is adjustable to position the animal relative to the jaws. The conventional combination of spaced jaws and a non-lock type spring mechanism enables the animal to free itself when small or, in the case of large animals pull free of the trap with virtually no damage.

A further advantage to the invention is the provision of a trip mechanism which includes a pan, pressure upon which at any point thereof, actuates the trip mechanism and allows the trap to be sprung.

In accordance with the invention there is provided an animal trap comprising in combination a base, a pair of open jaws pivoted by each end thereof to opposite sides of said base, coil spring means operatively connected to said jaws and normally urging the jaws away from one another towards said base and trip means within the base operatively connected to said jaws and normally maintaining the jaws in the vertical, open position substantially perpendicular to said base, against the pressure of said spring means when in the "set position" and means on said trap maintaining said jaws a predetermined distance above said base when tripped thus reducing the possibility of trapping an animal's foot therebetween, said trip means including a pan, pivot means mounting said pan by one side thereof, to said base for partial pivotal movement in a vertical plane, said pan extending across said base towards the outside thereof, a trigger component extending upwardly from said base adjacent the pivotal means of said pan and including a pair of fingers extending upwardly from said component engaging said jaws one each upon the outer side of each of said jaws, when said jaws are in the substantially vertically "set" position, whereby depression of said pan disengages said fingers from said jaws outwardly away from one another toward said base.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Proceeding therefore to describe the invention in detail with respect to FIGS. 1 to 7 inclusive, reference character 10 illustrates an open base comprising a pair of curved sides 11, rear sides 13, and front sides 14.

Figures 1, 6:
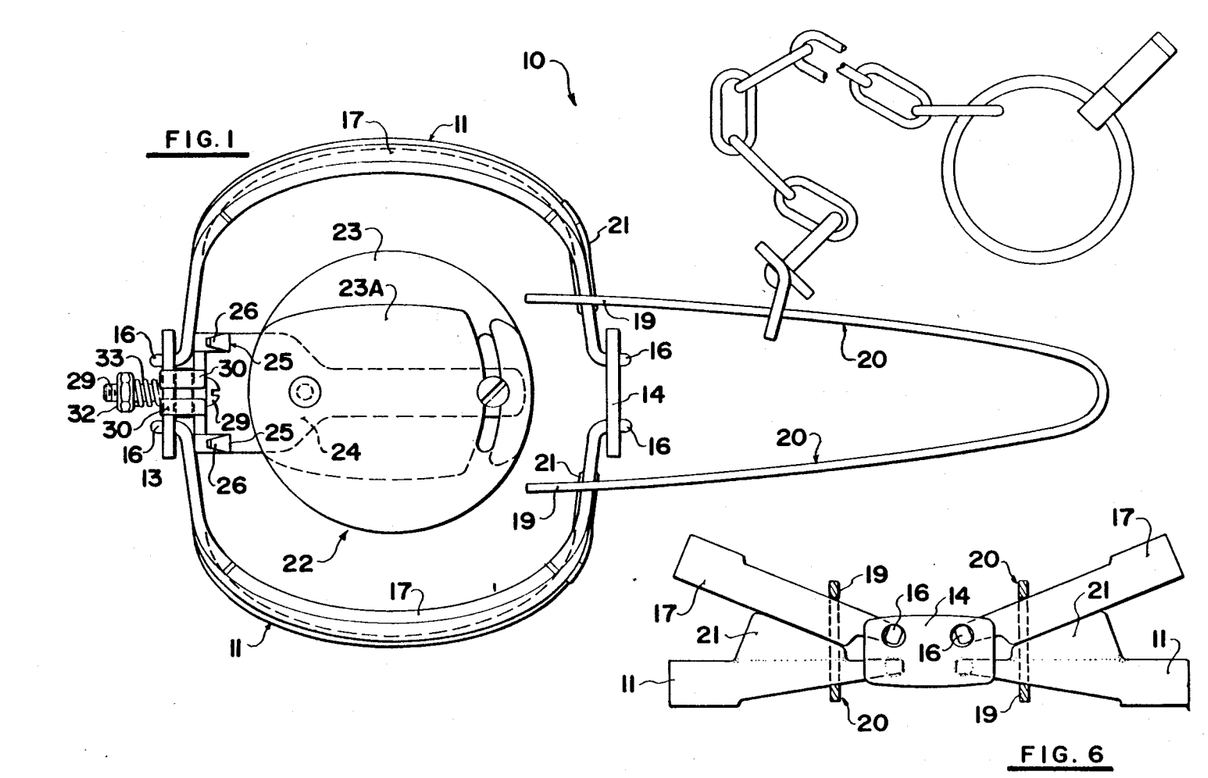
FIG. 1 is a top plan view of the trap in the released or "sprung" position.
FIG. 6 is a fragmentary rear elevation of the trap of FIG. 1.
Figures 2, 7:
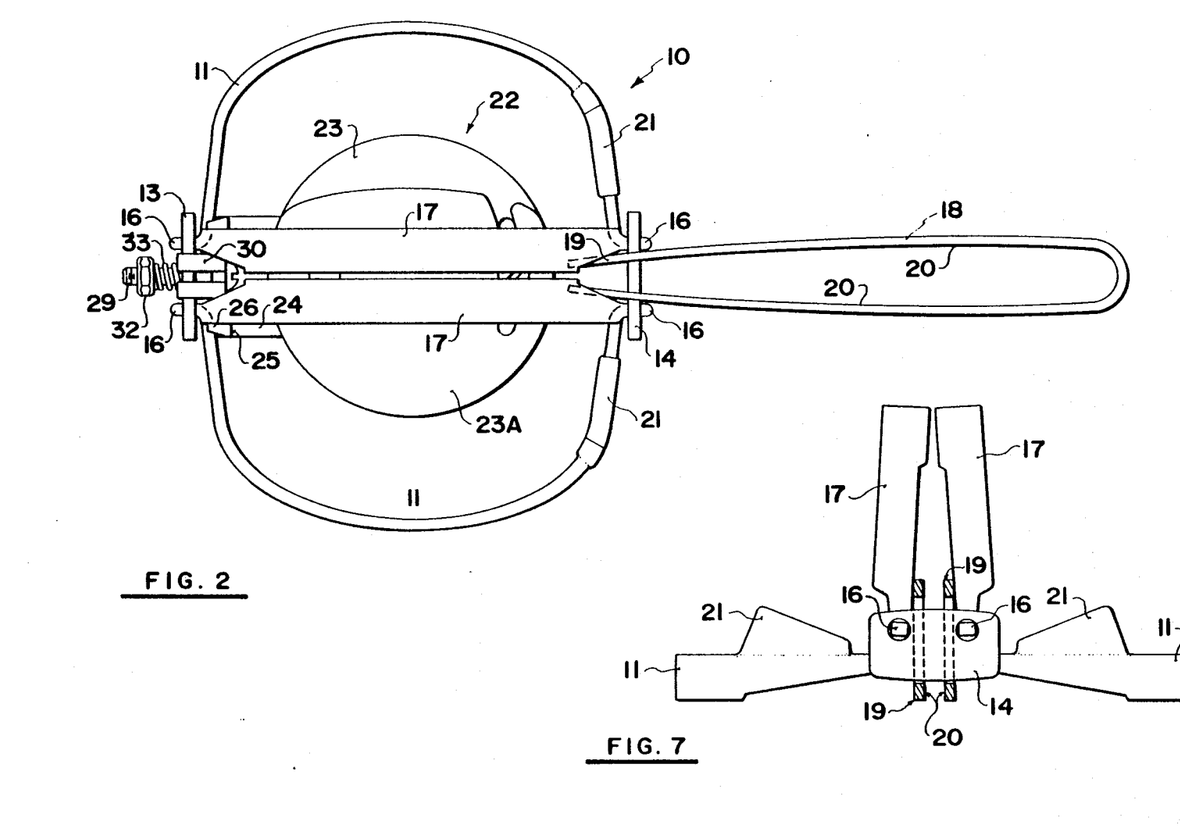
FIG. 2 is a plan view similar to FIG. 1 but shwoing the trap in the "set" position.
FIG. 7 is a fragmentary rear elevation of the trap in FIG. 2.

A lug extends upwardly from the inner ends of the front sides 11 at 14 and is identified in FIGS. 6 and 7 by reference character 21. The front side 14 and the rear side 13 are apertured to received the upturned ends 16 of a pair of substantially semi-circular movable jaws 17 with the holes being substantially diametrically opposite one another so that the jaws are pivotally mounted and are of a somewhat similar configuration to the base ring 11.

A heavy duty strap spring 18 is provided with apertured ends 19 which engage over the ends of the base rings and over the ends of the movable jaws with the legs 20 of the spring 18 normally urging the jaws towards the base ring in the sprung position. However, when the jaws are moved to the substantially vertically "set" position shown in FIGS. 2, 4 and 7, the ends 19 of the spring are forced inwardly towards one another thus storing energy within the spring, which, when released, moves the jaws rapidly to the sprung position shown in FIGS. 1 and 3 and locks the trap in the sprung position.

Normally, these jaws would strike the base ring when sprung thus trapping an animal's foot therebetween if the trap did not strike the animal in the head or neck area.

Figure 3:
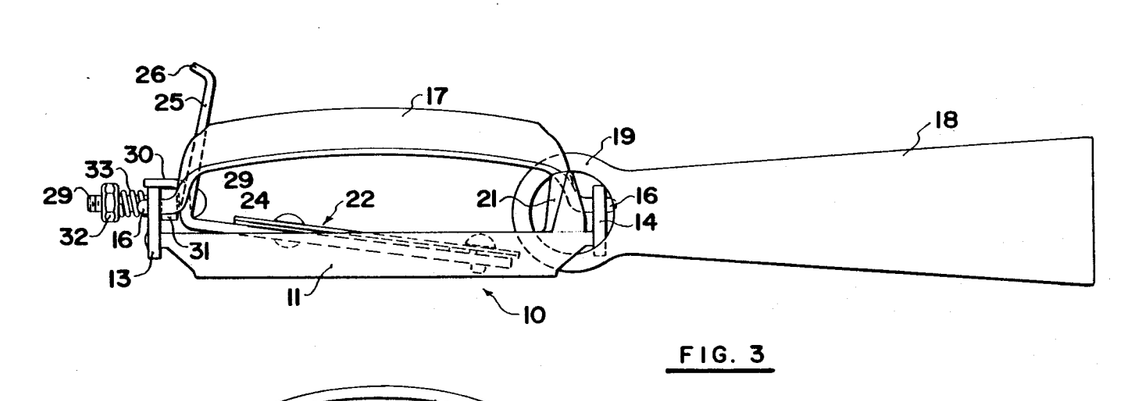
FIG. 3 is a side elevation of FIG. 1.
Figure 4:
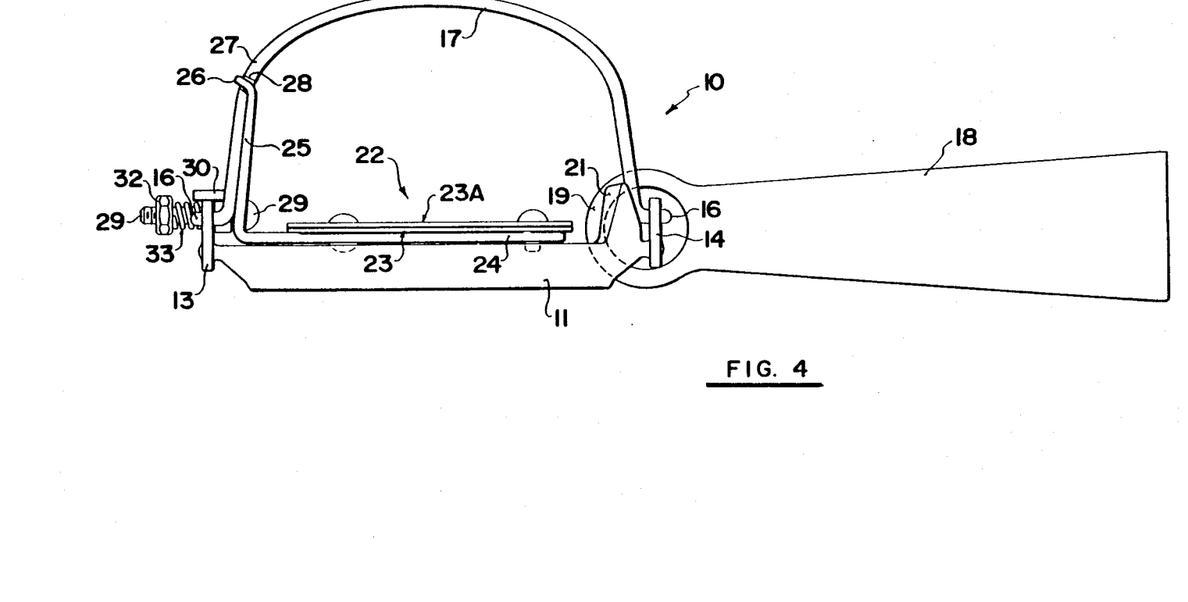
FIG. 4 is a fragmentary enlarged side elevation of the ttrip portion of FIG. 2.

In order to prevent the foot trapping aspect of such traps, a truncated wedge shaped step block is formed on or secured to the inner ends 21 of the base ring preferably adjacent the spring connection so that when the trap is in the sprung position, the jaws do not meet the base ring but are maintained above the base ring thus defining a space therebetween as clearly shown in FIGS. 3 and 6.

If desired, similar stop blocks may of course be located on the other side of the base ring engagable by the diametrically opposite portions of the movable jaws 17.

Figure 5:
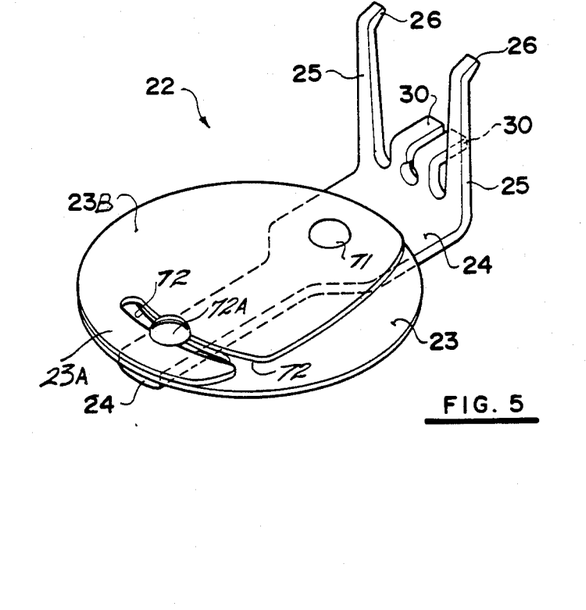
FIG. 5 is an isometric view of the trip assembly and adjustable pan.

A trip or tripper mechanism is provided and is shown by reference character 22 in FIG. 5. It consists of a substantially circular pan 23 although other shapes may, of course, be utilized. This is secured to a member 24, an extension of which extends upon the underside of the pan and is secured thereto. The member 24 is provided with a pair of upstanding, spaced apart fingers 25 having out turned upper ends 26 and, when set, each of these two legs engages upon the outer edge 27 of the two jaws and within notches 28 provided therein as will hereinafter be described.

The trigger or trip assembly is mounted to the upstanding lug 13 on the base ring by means of a pin 29 freely extending through an aperture within the lug. A tab 30 extends upwardly and over from one end of the member 24 with the pin 29 extending through this portion to mount the assembly to the base and a small roller 31 is mounted on the pin between the tab 30 and the lug 13 with the forwardly extending portion of the tab engaging the roller to facilitate a racking or partial rotational movement of the pan assembly upon the pin 29. A nut 32 engages the pin on the outside thereof and compresses a small coil spring 33 reacting between the nut and the lug 15 to adjust the tension of the pan assembly thus controlling the resistance of the pan assembly from the aforementioned rocking or rotational movement.

From the foregoing it will be appreciated that pressure upon any part of the pan 23 will either move the pan downwardly and rearwardly if applied in the area identified by reference character 23A thus disengaging the fingers 26 from the grooves or notches 28 or pressure in any of the side areas of the pan identified by reference character 23B will also disengage one or the other of the fingers thus releasing both jaws and causing the jaws to be urged outwardly and downwardly towards the base by the kinetic energy stored with spring 18. Once again it should be noted that these jaws will be stopped by the stop blocks 21 before they actually meet the base thus preventing an animal's foot from being trapped. However if the animal inserts the head and neck area between the vertically situated jaw and the base, in order to remove bait from the pan, the trap normally will spring so that the jaws strike the animal upon the head or neck area thus killing same outright.

Proceeding next to describe the preferred embodiment, reference should be made to FIGS. 8 through 16.

Figure 11:
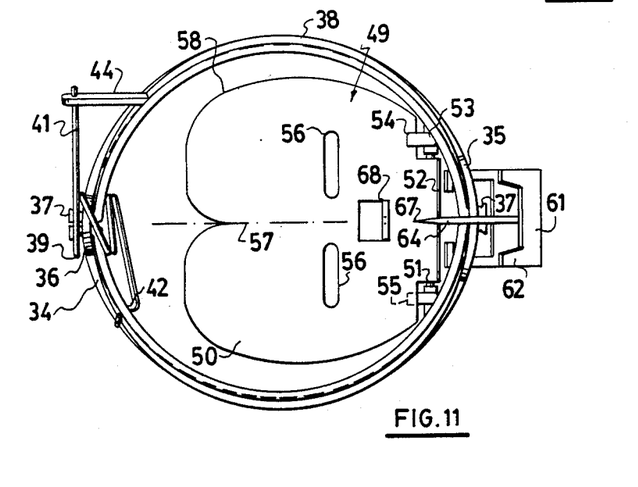
FIG. 11 is a top plan view of the preferred embodiment shown in the released position.
Figure 12:
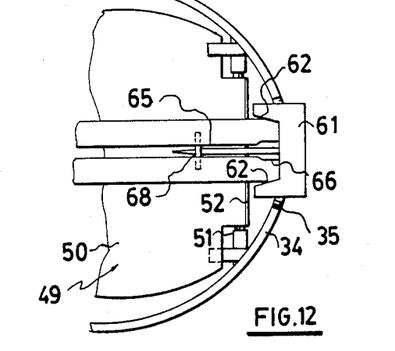
FIG. 12 is a fragmentary top plan view of the preferred embodiment shown in the "set" position.
Figure 13:
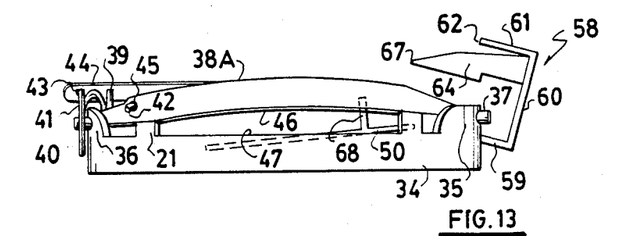
FIG. 13 is a side elevation of FIG. 11.
Figure 14:
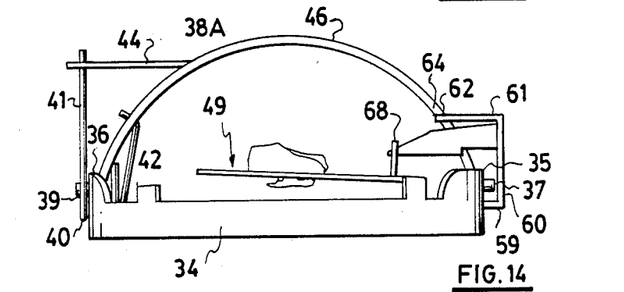
FIG. 14 is a side elevation of the preferred embodiment in the "set" position.

It consists of a substantially circular ring type base 34 having a relatively narrow width and a depth best shown in FIG. 14, lugs 35 and 36 extend upwardly at diametrically opposite points around the circumference of the base 34 and these lugs receive pintles 37 formed on the ends of substantially semi-circular jaws 38 and 38A which are thus mounted from pivotal movement through an arc extending between the released or tripped position shown in FIGS. 11 and 13 when the jaws are substantially horizontal and the "set" position when the jaws are substantially vertical or perpendicular to the plane of the base and substantially in interfacial relationship, as shown for example in FIGS. 12 and 14.

In this connection, a coil spring 39 is provided having a plurality of coils 40 formed therein with an anchor extension 41 extending from one end of the coils and a further anchor extension 42, extending from the other end thereof.

This coil spring is situated adjacent lug 36 and the base ring at this point is forced downwardly between adjacent coils substantially intermediate the ends of the coil spring thus holding the coil spring transversely in position with some of the coils being situated outwardly of the base and the remainder being situated inwardly thereof. The anchor extension 41 engages through an aperture 43 formed adjacent the end of anchor member 44 extending from one side of jaw 38 as clear shown in FIG. 11.

The anchor portion 42 engages through an aperture 45 formed through the jaw 38A as clearly shown in FIGS. 11 and 13 and the winding of the coils 40 is such that when installed, the coils urge the jaws to the tripped position upon the base 34. When the jaws are moved to the "set" position, the spring is wound so that kinetic energy is stored therein.

As in the previous embodiment, a wedge shaped stop 21 is provided upon the base to maintain the outer edge 46 of the jaws clear of the upper edge 47 of the base. However FIG. 15 shows a preferred method of obtaining this result consisting of forming the major portion of the outer edge 46 of the jaws in an arcuately concave curve illustrated by reference character 46A so thta when the jaws are in the tripped position, a space 48 is maintained between the jaws and the base to facilitate animal release when caught by a leg or the like.

Figure 15:
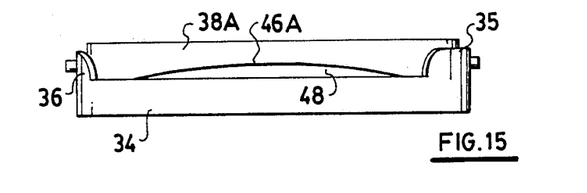
FIG. 15 is a side elevation of the jaws and base showing the preferred embodiment of the spacing configuration.

It should be understood that the construction shown in FIG. 15 is equally applicable to the previous embodiment.

Trip means collectively designated 49 are provided in the preferred embodiment and include a substantially planar disc-like pan 50 having pivot pins 51 extending upon each side thereof adjacent one side 52 thereof. These pivot pins engage within bearings 53 extending inwardly from the base adjacent each side of lug 35. Incorporated with these bearings is a limit stop 54 on one side thereof which limits the upward movement of the pan and a further stop 55 on the other side thereof which limits the downward movement thereof so that the pan can pivot upwardly and downwardly within limits relative to the base.

This pan is provided with elongated slots 56, one upon each side of the longitudinal axis 57 and terminating spaced inwardly from the outer edge 58 thereof.

These are designed to receive bait which is pushed into the slot and normally freezes into position with the elongated slots providing limited adjustment of the position of the bait relative to the longitudinal axis 57 for the purpose of accommodating variation in size of the animal to be trapped. The positioning of the bait assists in positioning the animal relative to the trap when same is sprung thus ensuring that the animal for which the trap is placed, is in the killing position and it will be noted that access to the tripper mechanism is equal on both sides only and not from any other direction.

By providing bait positioning means, the traps need be manufactured in fewer sizes than heretofore and if, for example, a larger animal than desired springs the trap, then the space between the jaws and the base in conjunction with the non-locking coil spring actuating means, enables the animal to free itself with virtually no damage to the animal. This is in contrast with the form of spring illustrated in the previous embodiment which tends to lock once the trap is sprung and prevents any relative movement between the jaws and the base if the animal is not killed outright.

Figure 9:
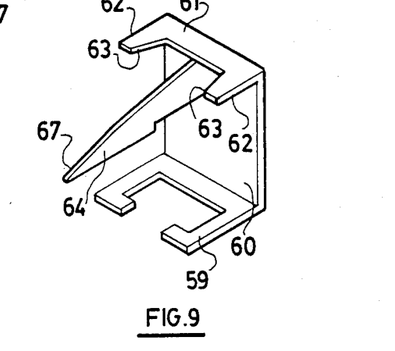
FIG. 9 is an isometric view of the trigger component per se.

In conjunction with the pan, there is provided a trigger component collectively designated 58 and shown in FIGS. 9 and 13.

It consists of a pair of inwardly extending pintles 59 formed one upon each side of the lower edge of a strut 60 which extends upwardly from the pintles. The pintles engage through apertures in the lug 35 below and to the outer sides of the apertures in which the jaws engage and the ends may be bent over to retain the trigger component which allow free pivotal movement through an arc from a position shown in FIG. 13 to the "set" position shown in FIG. 14.

The strut or plate 60 is provided with an inwardly extending horizontal portion 61 extending substantially perpendicular to the plane of the main vertical portion 60 and terminating in a pair of spaced apart fingers 62, one upon each side thereof.

The inner surfaces 63 of these fingers incline inwardly and towards one another as clearly shown in FIG. 9 and engage the outer edges 64 of the jaws when same are in the "set" or vertical position shown for example in FIGS. 12 and 14 with the spring 39 urging the jaws away from one another and endeavouring to force the trigger component away from the "set" position towards a position shown in FIG. 13. However this is resisted until the trap is sprung, by means of a pan engaging trigger member 64 extending inwardly from the vertical portion 60 of the plate and just below the horizontal portion 61 thereof. When in the "set" position, this portion 64 passes between the inner edges 65 of the jaws, which are cut away as at 66 for this purpose.

The distal end 67 of the portion 64 engages an apertured lug 68 extending upwardly from the pan and straddling the longitudinal axis 57 thereof. The sloping upper surface of the distal end 67 maintains the pan in the uppermost position by friction due to the pressure exerted by the spring 39 through the jaws 38 and 38A acting upon the fingers 62 of the trigger component. It will therefore be appreciated that the slightest downward pressure anywhere upon the pan 50 will disengage the lug 68 from the distal end 67 of the trigger portion 64 thus enabling the jaws to pivot the trigger component outwardly so that the jaws can release to the tripped position adjacent the base 34.

Figure 10:
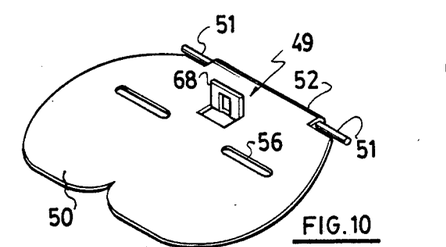
FIG. 10 is an isometric view of the pan per se.
Figure 16:
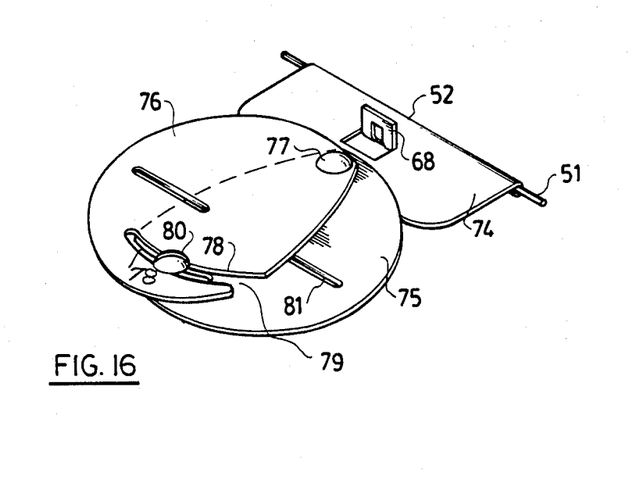
FIG. 16 is an isometric view of the preferred embodiment of the pan.

Referring back to the pan illustrated in FIGS. 5 and 10 together with the preferred embodiment thereof illustrated in FIG. 16, these both show adjustable pans.

Dealing first with the pan shown in FIG. 5, it consists of two partially circular plates 23 and 23B situated in planar overlapping relationship and pivoted to the portion 24 of the trigger assembly by means of pivot pin 71.

These plates are provided with slots 72 adjacent the peripheral edges 73 remote from the pivot pin 71 and the pin and nut assembly 72A extends through the slots and through the portion 24 pivot assembly with a nut (not illustrated) on the underside thereof so that the plates can be tightened in the desired position. When the pin and nut assembly 72 is loosened, the two plates may be spread apart or adjusted, pivoting on pin 71 to make the effective pan area larger or smaller within limits of the slots 72.

This assists in positioning the animal for a sure kill when the trap is sprung, the size of pan and the adjustable bait position allowing the trap to be set to trap the animals of varying sizes.

The embodiment shown in FIG. 10 is a fixed pan but a similarly adjustable pan for this particular embodiment is shown in FIG. 16.

Figure 8:
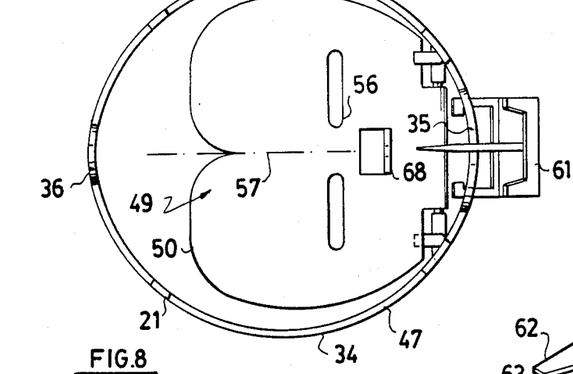
FIG. 8 is a top plan view of the base and trip means with the jaws removed for clarity.

In this particular embodiment, the pan consists of the base portion 74 having pins or pintles 51 extending outwardly from either side of the rear edge 52 and having apertured lug 68 extending upwardly centrally of the portion 74 all of which is similar to the pan illustrated and described in FIG. 10 and engageable by the trigger assembly shown in FIGS. 8, 9 and 11 as herein before described.

However the pan proper once again consists of two planar plates 75 and 76 pivoted in overlapping relationship by means of pivot pin 77, to the portion 74 just inboard of the lug 68.

Slots 78 having open ends 79 align with one another so that the plates 75 and 76 may be detachably secured in the desired relationship one with the other by means of a pin and nut assembly 80, with the nut (not illustrated) being tightened on the underside of pin 80 once the effective planar area of the plate has been adjusted to suit the animal being trapped.

Once again the elongated bait slots 81 may be provided to receive the bait in varying positions which comma in conjunction with the adjustability of the pan area, enables the trap to be set in order to trap animals of different sizes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An animal trap comprising in combination a base a pair of open jaws pivoted by each end thereof to opposite sides of the said base, coil spring means operatively connected to said jaws and normally urging the jaws away from one another towards said base and trip means within the said base operatively connected to said jaws and normally maintaining the jaws in the vertical open position substantially perpendicular to said base, against the pressure of said spring means when in the "set" position, said jaws having inner and outer edges when in the "set" position, said trip means including a pan and a separate trigger component operatively connectible thereto, said pan including means mounting said pan to said base for up and down pivotal movement, said means including a mounting portion, and a bait holding portion extending therefrom part way across said base, means to vary the effective area of said bait holding portion within limits, and bait holding means in said bait holding portion, said bait holding means including a pair of bait retaining, elongated slots formed therethrough and extending from adjacent the longitudinal axis of said pan towards the edges thereof, perpendicular to said longitudinal axis, said slots providing bait position adjustment thereof relative to said edges of said pan.

2. The trap according to claim 1 in which said bait holding portion includes a pair of partially overlapping plates, pivot means extending through both of said overlapping baits and through said mounting portion wherenby said plates can be opened and closed relative to one another thus varying the effective area thereof, and means to detachably clamp said plates in the desired overlapping relationship one with the other.

3. Trap according to claim 2 in which said means to clamp said plates in the desired overlapping relationship includes arcuates slots in each of said plates, said slots being in overlapping relationship with one another, and detachable clamp means extending through said arcuate slots.

4. The trap according to claim 1 in which said trigger component includes a central vertical strut portion, a base portion extending perpendicularly from the lower end of said vertical portion a pair of pintles on the distal end of said base portion and extending inwardly towards one another, said pintles operatively engaging said base of said trap to pivotally mount said trigger component for limited pivotal movement in a vertical plane, prefer the horizontal portion extending perpendicularly from the upper end of said strut portion, spaced and parrallel to said base portion, a pair of spaced apart fingers formed on the distal end of said further horizontal portion, one on each side thereof and in the same plane thereof, said fingers each including an inner side edge facing one another, said inner side edges detachably engaging the outer edges of said jaws when in the "set" position, said inner side edges of said fingers inclining inwardly from the distal ends thereof towards said vertical strut portion and release means extending from said vertical portion and being operatively connectible to said pan.

5. The trap according to claim 2 in which said trigger component includes a central vertical strut portion, a base portion extending perpendicularly from the lower end of said vertical portion a pair of pintles on the distal end of said base portion and extending inwardly towards one another, said pintles operatively engaging said base of said trap to pivotally mount said trigger component for limited pivotal movement in a vertical plane, prefer the horizontal portion extending perpendicularly from the upper end of said strut portion, spaced and parrallel to said base portion, a pair of spaced apart fingers formed on the distal end of said further horizontal portion, one on each side thereof and in the same plane thereof, said fingers each including an inner side edge facing one another, said inner side edges detachably engaging the outer edges of said jaws when in the "set" position, said inner side edges of said fingers inclining inwardly from the distal ends thereof towards said vertical strut portion and release means extending from said vertical portion and being operatively connectible to said pan.

6. The trap according to claim 3 in which said trigger component includes a central vertical strut portion, a base portion extending perpendicularly from the lower end of said vertical portion a pair of pintles on the distal end of said base portion and extending inwardly towards one another, said pintles operatively engaging said base of said trap to pivotally mount said trigger component for limited pivotal movement in a vertical plane, a further horizontal portion extending perpendicularly from the upper end of said strut portion, spaced and parallel to said base portion, a pair of spaced apart fingers formed on the distal end of said further horizontal portion, one on each side thereof and in the same plane thereof, said fingers each including an inner side edge facing one another, said inner side edges detachably engaging the outer edges of said jaws when in the "set" position, said inner side edges of said fingers inclining inwardly from the distal ends thereof towards said vertical strut portion and release means extending from said vertical portion and being operatively connectible to said pan.

7. The trap according to claim 4 in which said means detachably engaged by the distal end of said trigger member includes an apertured lug extending upwardly from said mounting portion of said pan and on the longitudinal axes thereof, the distal end of said trigger member engaging with inset apertured lug and detachably maintaining said pan in the "set" position due to pressure of said coil spring means reacting upon said jaws and hence said trigger component.

8. The trap according to claim 5 in which said means detachably engaged by the distal end of said trigger member includes an apertured lug extending upwardly from said mounting portion of said pan and on the longitudinal axes thereof, the distal end of said trigger member engaging with inset apertured lug and detachably maintaining said pan in the "set" position due to pressure of said coil spring means reacting upon said jaws and hence said trigger component.

9. The trap according to claim 6 in which said means detachably engaged by the distal end of said trigger member includes an apertured lug extending upwardly from said mounting portion of said pan and on the longitudinal axes thereof, the distal end of said trigger member engaging with inset apertured lug and detachably maintaining said pan in the "set" position due to pressure of said coil spring means reacting upon said jaws and hence said trigger component.

10. The trap according to claim 1 in which said coil spring means includes a plurality of coils and an anchor portion extending from each end thereof, one of set anchor portions being operatively secured to one of said jaws, the other said anchor portion being operatively secured to the other of said jaws, said base engaging between a pair of adjacent coils of said springs substantially centrally along the length of said spring whereby some of said coils are situated externally of said base and the remainder of said coils are situated internally of said base and of said jaws.

11. The trap according to claim 2 in which said coil spring means includes a plurality of coils and an anchor portion extending from each end thereof, one of set anchor portions being operatively secured to one of said jaws, the other said anchor portion being operatively secured to the other of said jaws, said base engaging between a pair of adjacent coils of said springs substantially centrally along the length of said spring whereby some of said coils are situated externally of said base and the remainder of said coils are situated internally of said base and of said jaws.

12. The trap according to claim 3 in which said coil spring means includes a plurality of coils and an anchor portion extending from each and thereof, one of set anchor portions being operatively secured to one of said jaws, the other said anchor portion being operatively secured to the other of said jaws, said base engaging between a pair of adjacent coils of said springs substantially centrally along the length of said spring whereby some of said coils are situated externally of said base and the remainder of said coils are situated internally of said base and of said jaws.

13. The trap according to claim 4 in which said coil spring means includes a plurality of coils and an anchor portion extending from each and thereof, one of set anchor portions being operatively secured to one of said jaws, the other said anchor portion being operatively secured to the other of said jaws, said base engaging between a pair of adjacent coils of said springs substantially centrally along the length of said spring whereby some of said coils are situated externally of said base and the remainder of said coils are situated internally of said base and of said jaws.

14. The trap according to claim 7 in which said coil spring means includes a plurality of coils and an anchor portion extending from each end thereof, on of set anchor portions being operatively secured to one of said jaws, the other said anchor portion being operatively secured to the other of said jaws, said base engaging between a pair of adjacent coils of said springs substantially centrally along the length of said spring whereby some of said coils are situated externally of said base and the remainder of said coils are situated internally of said base and of said jaws.

* * * * *